United States Patent [19]

Von Volkli

[11] Patent Number: 4,693,678

[45] Date of Patent: Sep. 15, 1987

[54] MALE LAYUP-FEMALE MOLDING SYSTEM FOR FABRICATING REINFORCED COMPOSITE STRUCTURES

[75] Inventor: Arthur D. Von Volkli, Renton, Wash.

[73] Assignee: The Boeing Company, Seattle, Wash.

[21] Appl. No.: 819,039

[22] Filed: Jan. 15, 1986

[51] Int. Cl.$^4$ ............................................. A01J 21/00
[52] U.S. Cl. ............................... 425/405 R; 425/417; 425/DIG. 60; 264/510
[58] Field of Search ............... 249/122, 150, 160, 175, 249/178, 179, 184; 264/101, 257, 313, 510, 511; 425/DIG. 44, DIG. 60, 405 R, 416, 417

[56] References Cited

U.S. PATENT DOCUMENTS

| | | | |
|---|---|---|---|
| 1,637,708 | 8/1927 | Porter | 425/417 |
| 3,336,873 | 8/1967 | Wilford | 264/3.1 |
| 3,479,666 | 11/1969 | Webb | 2/3 |
| 3,817,806 | 6/1974 | Anderson et al. | 264/511 X |
| 3,980,414 | 9/1976 | Shannon et al. | 425/405 R X |
| 4,052,241 | 10/1977 | Walter | 264/510 X |
| 4,067,950 | 1/1978 | Baruschke et al. | 264/257 |
| 4,100,249 | 7/1978 | Giron | 249/150 X |
| 4,155,970 | 5/1979 | Cassell | 264/137 |
| 4,379,013 | 4/1983 | Tambussi | 156/189 |
| 4,466,138 | 8/1984 | Gessalin | 2/243 R |

Primary Examiner—Charles Hart
Attorney, Agent, or Firm—Christensen, O'Connor, Johnson & Kindness

[57] ABSTRACT

A flexible rubber boot that transmits molding pressure to the inner surface of the structure to be molded is placed on a support fixture. The boot is held in place by a vacuum applied between the fixture and the boot. Prepregs are laid up on the boot to the desired depth and in a desired configuration. A female mold assembly, consisting of two sections, is then placed over the prepreg material and sealed to the boot. A vacuum is applied to the sealed region between the mold and boot, compressing the material against the interior of the mold that defines the outer surface of the structure. The assembly of boot, mold, and material is then placed in an autoclave. After the material has cured, the finished structure is separated from the mold and boot. The tooling is reusable and the process completed easily, allowing the efficient fabrication of structure having smooth inner and outer surfaces.

15 Claims, 13 Drawing Figures

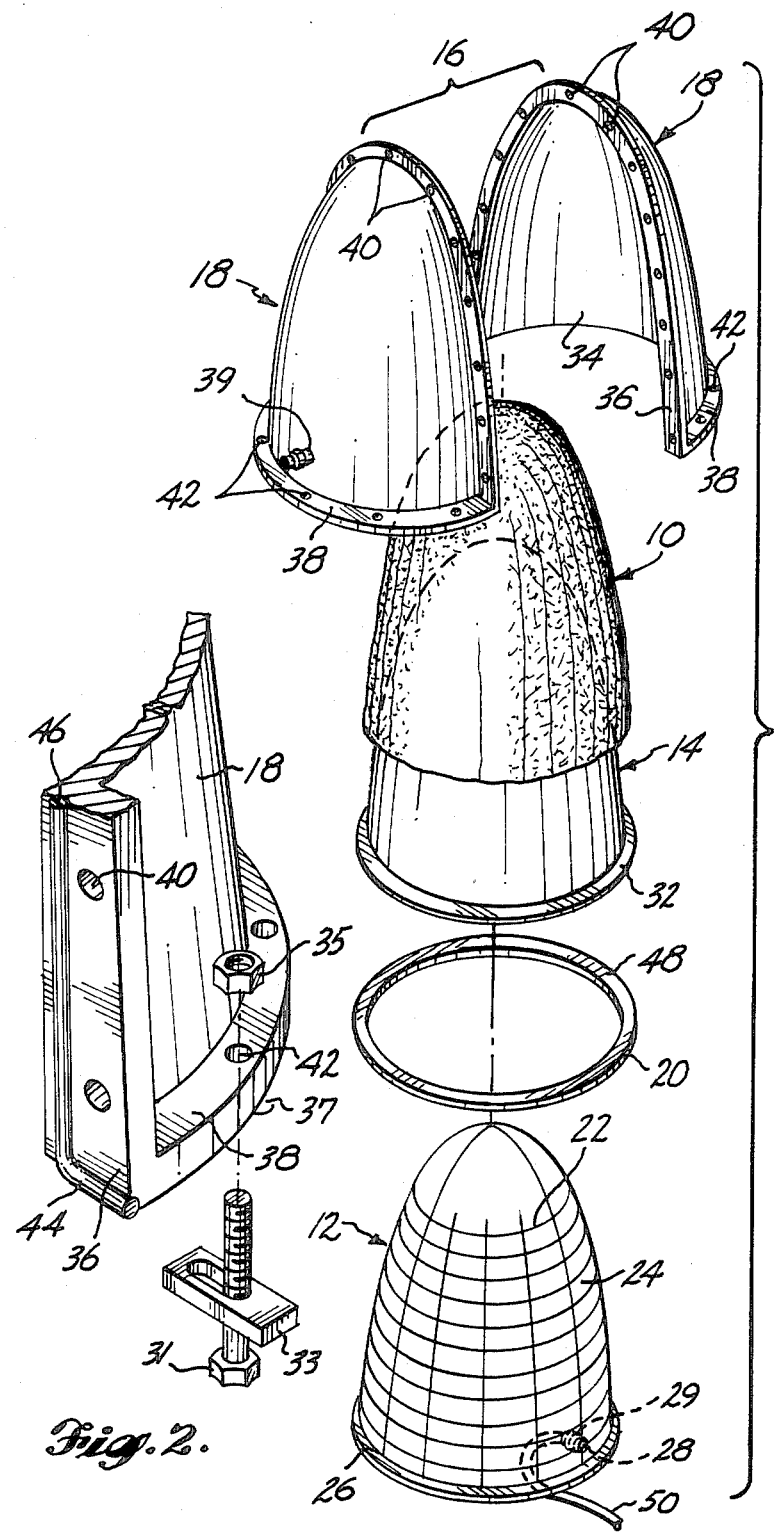

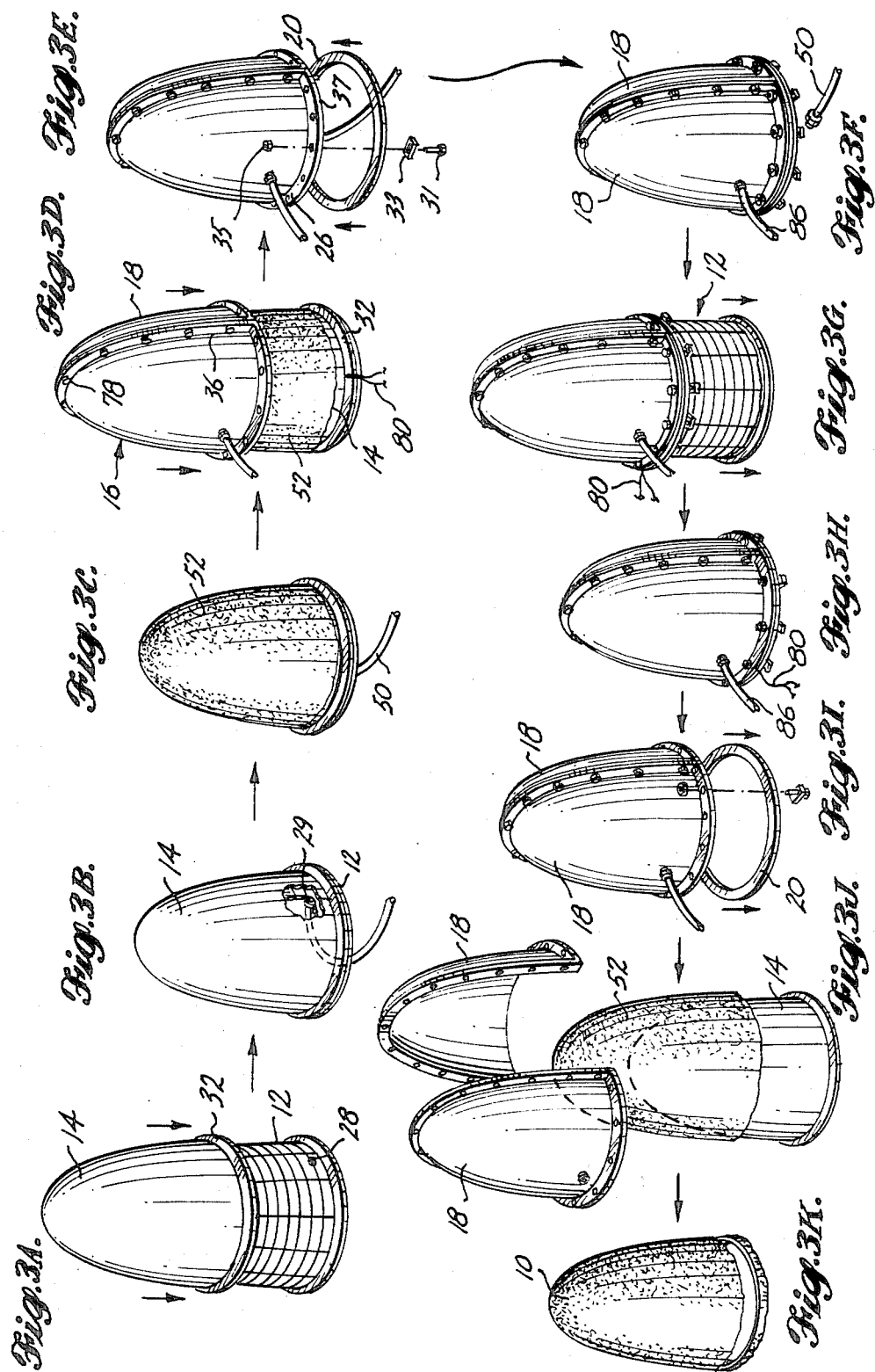

MALE LAYUP-FEMALE MOLDING SYSTEM FOR FABRICATING REINFORCED COMPOSITE STRUCTURES

The United States Government has rights in this invention pursuant to Contract No. N00019-83-C-0176, which was awarded by the United States Navy.

BACKGROUND OF THE INVENTION

This invention relates to methods and apparatus for the fabrication of a fabric-reinforced resin composite structure. More particularly, the invention is directed to the fabrication of a composite structure having a precisely determined, aerodynamically smooth outer surface (i.e., free of wrinkles, indentations and other irregularities). The invention is especially suited for fabrication of tubular or shell-type radomes and other structures.

In recent years, the use of high strength-to-weight ration fabric-reinforced composites has grown dramatically, particularly in the aerospace industry where components that are constructed totally or partially of such materials can provide substantial weight savings without sacrificing strength or structural integrity. The ability to produce relatively large, shell-like structures from such composites has also increased their usage in the aerospace field. In one method of fabricating composite structures, plies or sheets that are formed from woven fibers and impregnated with partially cured resin ("prepreg") are laid up on (or within) a mold.

To make a composite having a precisely dimensioned smooth inner surface, the prepregs are laid over and cured on a male mold. To make a composite having a precisely dimensioned, smooth outer surface, the prepregs are laid up and cured in a female mold. In these conventional fabrication processes, a flexible vacuum bag is placed over the material laid up on the mold. The bag is then sealed and evacuated and the assemblage of the mold, laid up material and vacuum bag placed in an oven or autoclave and cured at an appropriate temperature and pressure. During this process, the resin contained in the preimpregnated reinforcing material or applied to the unimpregnated reinforcing material during layup flows to consolidate the various layers or plies into a high-strength, rigid, unitary structure. To ensure maximum strength and consolidation of the structure, the curing process must be closely controlled and monitored so that relatively uniform heat and pressure are applied to all portions of the structure being fabricated. Without such control, the strength and quality of the composite structure will be less than optimal because of uneven resin flow, voids, uneven plies or other defects, and other factors. In many instances, these imperfections will mean that the composite structure cannot be used and must be scrapped.

When these conventional techniques are employed, only the surface of the composite that is adjacent the surface of the mold will be relatively smooth. Sometimes it is possible to remedy this situation after cure by applying a filler material to local indentations and by sanding or otherwise machining the surface. The additional processing steps, however, increase fabrication costs. The composite must also be specifically designed to accommodate such operations because filling and sanding, or machining, can adversely affect the structural integrity of the composite. Of even greater importance, such operations often are impractical or impossible for aircraft parts that must be aerodynamically smooth (e.g., having a maximum deviation from lofted surface on the order of ±0.032 in. (±0.081 cm) and a maximum depth-to-length ratio on the order of 0.003). Since a radome serves as a "window" for electromagnetic energy, its thickness, composition, and smoothness of the surfaces must also be closely controlled to reduce diffraction effects. The method of the present invention virtually eliminates machining or post-molding preparation of the surface finish of composites.

U.S. Pat. No. 4,067,950 discloses a prior art compression molding process for making radomes wherein a stocking-shaped webbing is inserted in a female mold and is filled with resin-impregnated fiber pellets. A male mold is then urged into the female mold as heat is applied, melting the resin and pushing it through the webbing. When curing is complete, the mold is cooled and a radome having smooth inner and outer surfaces is removed. Although prepreg material can be compression molded, the axial profile of most radomes prevents the use of prepreg material in the process disclosed in U.S. Pat. No. 4,067,950. Specifically, except in limited cases, the prepreg material cannot be placed in the female mold and compressed without forming wrinkles and other irregularities. Further, because of the relatively high temperatures and pressures involved, the tooling is typically both heavy and expensive.

U.S. Pat. No. 3,479,666 discloses a method for manufacturing a military helmet. Prepreg sheets are laid upon a slightly inflatable rubber male mold that is rigid enough to be self supporting. A female mold is placed over the male mold preform. Inflation of the male mold forces the prepreg against the surface of the female mold while curing occurs. When large structures are to be fabricated, the method has several drawbacks. First, it is difficult to produce a male mold that is flexible enough to respond to internal pressure, while simultaneously being rigid enough to resist deformation during the layup process. Second, because the female mold must withstand the pressure applied by the male mold, it is generally relatively heavy and costly.

In U.S. Pat. No. 4,379,013, a tubular spar of a composite helicopter rotor blade is fabricated by winding prepreg tape on a disposable mandrel covered with a pair of disposable pressure bags formed from folded sheets of plastic. The assembly is placed in a female mold that is contoured to define the outer shape of the blade. The bags are then pressurized, forcing the prepreg material against the female mold cavity while heat is applied to cure the resin. As with the methods discussed previously, when large parts such as radomes are to be fabricated, the female mold required is generally relatively heavy. Fabrication costs include the disposable tools consumed. This method of fabricating composite structure is further incapable of producing a wrinkle-free inner surface.

In many instances, prior art techniques using a female mold to obtain the desired smooth outer surface finish are of limited utility. For example, a one-piece female mold is not practical for fabricating a radome that is 60 to 70 inches long and only 18 inches in diameter at its widest point, since it is virtually impossible to place the prepreg on the inner surface of the mold without wrinkles or other defects. Further, once cured, it is almost impossible to get the radome out of the mold without destroying the mold. Thus, in the prior art, radomes of axial profiles that do not permit use of a unitary female mold have been formed in sections and bonded together to complete the radome or have been formed on a male mold with the resulting loss of precise control of the outer surface.

SUMMARY OF THE INVENTION

In accordance with this invention, an apparatus is provided for fabricating composites having a precisely contoured, smooth outer surface and a relatively smooth inner surface. Basically, the fabrication system of this invention includes: a layup support fixture; a female mold assembly adapted to fit over the fixture; and, a flexible boot that is used in conjunction with both the layup support fixture and the female mold assembly. The boot, contoured to approximate the inner geometry of the structure being fabricated, is placed over the support fixture and a vacuum is applied between the boot and support fixture to ensure that the flexible boot does not move during layup. Prepregs are laid up on the outer surface of the boot.

The female mold assembly is a thin-walled shell consisting of a plurality of sections and having an inner surface that is configured to match the outer geometry of the composite structure being fabricated. After the mold is placed over the uncured composite material, the boot and female mold assembly are sealed to one another. The cavity between the boot and mold assembly is then evacuated via vacuum ports in the assembly to draw the boot toward the mold assembly and to compress the uncured composite material. The layup support fixture is removed and the remaining parts are placed in an autoclave for curing the structure at appropriate temperatures and pressures. When the curing process is complete, and the components have cooled, the airtight seal between the boot and the assembly is released and the structure is removed from the mold.

For radomes, the female mold assembly usually includes two substantially identical half sections that are joined together by bolts or other conventional fasteners to allow quick release of the composite from the mold. A seal between the sections completes the assembly. A flange on the open end of the assembly forms a seal with the boot and a flat clamp ring.

BRIEF DESCRIPTION OF THE DRAWING

Various features and advantages of the invention will be understood in view of the following description, taken together with the accompanying drawings, in which:

FIG. 1 is an exploded view which illustrates an embodiment of the invention for fabricating composite radomes;

FIG. 2 is an enlarged view of a portion of the female mold assembly of FIG. 1, which depicts a seal that forms an airtight joint when sections of the female mold assembly are joined to one another;

FIGS. 3A through 3K illustrate the basic sequence that is utilized in accordance with the invention for fabricating radomes;

DETAILED DESCRIPTION

Figure 4:
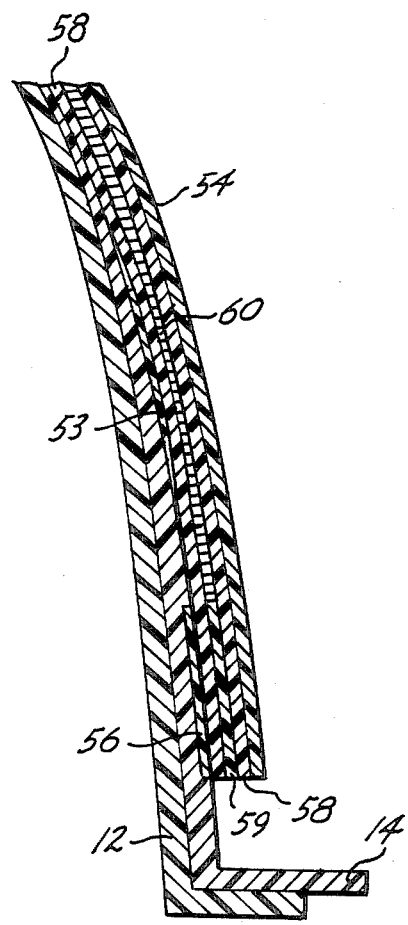
FIG. 4 is a side elevation view, in partial cross section, that depicts the manner in which layers of uncured composite material are placed on the surface of a supported flexible boot during one step of the sequence shown in FIG. 3.

FIG. 1 illustrates an embodiment of the invention that is configured for the fabrication of a composite radome 10 of parabolic longitudinal cross-sectional geometry, using a layup support fixture 12; a flexible boot 14; a female mold 16, which includes two female mold half sections 18; and a clamp ring 20.

A series of intersecting longitudinal and circumferential vacuum grooves 22 forms a lattice-like pattern on the outer surface 24 of the fixture 12. A flange 26, which may be omitted, extends circumferentially about the lower end of the fixture 12. The grooves 22 communicate with one or more vacuum ports 28 that have conventional vacuum fittings 29 which extend into the fixture 12. Preferably, two ports 28 are included and are circumferentially spaced about 180° apart.

Since the fixture 12 is not subjected to either high pressure or temperature, it preferably is made from epoxy/fiberglass material that can be processed and cured at room temperature. The fixture 12 is a relatively thin (e.g., $\frac{1}{4}$-$\frac{3}{8}$ inch (0.64-0.95 cm) thick) shell that is generally shaped to provide a surface that substantially parallels the inner surface of the radome to be made.

A flexible silicone rubber boot 14 fits snugly over the fixture 12 and is formed to establish the contour of the inner surface of radome 10. The outer mold line of boot 14 is established in view of the shape and dimensions of the radome inner surface, accounting for both the final radome wall thickness and the thickness of the layers of uncured prepreg used to fabricate the radome. In most cases, boot 14 will have a nonuniform thickness to match changes in the thickness of radome 10. A flange 32, which circumferentially surrounds the open end of boot 14, extends outwardly beyond the outer periphery of flange 26 when the boot 14 is positioned on the fixture 12.

The boot 14 is constructed of durable material that is capable of withstanding the curing temperature for the resin being fabricted while facilitating both release of the composite (with or without a release agent, as necessary) and reuse of the fixture and boot. To eliminate shrinkage and prevent heat set of the boot 14 during initial use, boot 14 is formed with a curing process in which the boot 14 is slowly heated from room temperature to a temperature above the curing point of the radome. Silastic E silicone rubber manufactured by Dow Corning currently is the preferred material for the boot 14. In fabricating randomes having an axial length on the order of 26 inches (66 cm) and a diameter at the open end on the order of 18 inches (40 cm), a boot 14 having a minimum wall thickness of approximately 0.25 inches (0.64 cm) has been proven satisfactory.

The female mold 16 includes a plurality of sections 18, which are joined together to form the mold, such that the inner surface 34 conforms to the desired outer surface geometry of the radome 10. Preferably, each section 18 includes a conventional vacuum fitting 39 but only one is required. A longitudinal flange 36 and a circumferential flange 38 extend from the periphery of each section 18. When butted together about a suitable seal or gasket 44 (FIG. 2), the longitudinal flanges 36 are bolted together to form the complete female mold 16. To withstand the curing temperatures, the sections 18 are formed from an autoclave-cured, heat-resistant epoxy/glass composite material. For fabricating radomes having an axial length on the order of 26 inches (approximately 66 cm) and an open end diameter on the order of 18 inches (approximately 40 cm), ⅜ inch (approximately 1 cm) thick epoxy composite has been found sutiable.

A groove 46 on the face of one flange 36 (FIG. 2) between bolt holes 40 and the inner surface 34 of the section 18 holds the seal 44, which, in one embodiment of the invention, is a 0.25 inch (0.64 cm) diameter silicone rubber rod.

The clamp ring 20 (FIG. 1) is a substantially flat annular member dimensioned commensurate with the flange 32 of the boot 14 but less than the circumferential flange 38 of the sections 18. The inner diameter of clamp ring 20 is greater than the diameter of the fixture flange 26, allowing clamp ring 20 to be placed in contact with boot flange 32 when the boot 14 is on fixture 12. During fabrication of a radodme 10, the mold 16 is placed over the boot 14, and the clamp ring 20 is positioned beneath boot flange 32. Connecting bolts 31 (FIG. 2) include slotted clamp straps 33 and nuts 35 that retain bolts 31 in bolt holes 42 provided in flange 38. During one step of the fabrication process, the nut 35 on each bolt 31 is tightened, causing strap 33 to bear against the clamap ring 20 and sealing boot flange 32 between the clamp ring 20 and flanges 38 of the mold sections 18. The other end of the clamp strap bears against a riser 37 located on the circumferential flange 38. Although not shown in the figures, the boot 14 alternatively can be sealed to the mold sections 18 by bolts or other fasteners that are installed in aligned openings in the clamp ring 20, boot flange 32 and circumferential mold flange 38.

As described, the boot 14 is placed over the fixture 12 (FIG. 3A), which is lightly powdered with talc or another suitable material to aid in installation of the boot 14. The outer surface of the boot 14 is then cleaned with a suitable solvent, such as methyl ethyl ketone, and is dried. A release agent is then applied to the boot. "Frekote 33," from the Hysol Division of the Dexter Corporation, is preferred. Then the boot is sucked against the outer surface 24 of layup fixture 12 by suitable vacuum pressure (FIG. 3B), thus, preventing movement on the fixture during layup.

Layup lines, used for proper placement of prepreg on the boot 14, are applied to the outer surface of the boot 14, and prepregs are laid up in sufficient plies and orientation to provide the desired, cured thickness and configuration (FIG. 3C). Wrinkles or creases in the plies are easily avoided, since the entire boot surface is exposed and is easily accessible.

If desired, a tight-weave, nylon fabric, prepreg peel ply 53 (FIG. 4) may be applied to selected regions of the boot 14 to provide textured regions on the interior surface of the finished radome to which brackets or other components can be bonded. Machining plies 56 of FIG. 4 are used in areas, if so designed, such as the lower circumference of the radome, which may require machining so that the radome can be joined to its mating structure. Structural plies 58 overlie the machining plies. Each structural ply 58 usually is formed by a number of contiguous gores, with the adjoining gores being trimmed, for some structures, to form a butt joint that does not overlie a butt joint in the underlying ply. In fabricating a radome 10 that does not have uniform wall thickness, "filler plies" 59 are added to provide thicker regions. Generally, additional structural plies 58 are placed over any filler plies that are used. If so designed, machining plies 56 may overlie the structural plies 58. An unimpregnated, tight-weave, nylon fabric peel ply 54 is added as the final ply. Peel ply 54 serves as a processing aid for postioning the part within the mold and for removing unwanted air from the mold prior to curing. In addition, this final ply protects the radome surface during storage and, when peeled, provides a surface that readily accepts paint or other finishes.

Honeycomb core 60 can be sandwiched between plies, if so designed.

Figure 5:
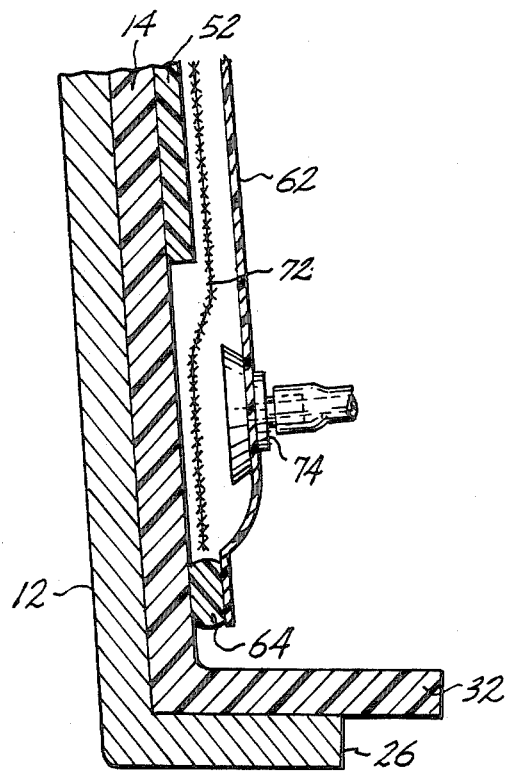
FIG. 5 is a partial cross-sectional view that illustrates an arrangement for compacting the uncured composite material during the process depicted in FIGS. 3A through 3K.

Compaction of plies during the layup can be achieved with a vacuum bag 62 placed over the plies of uncured material 52 and glass/fabric breather material 72, and sealed to the boot 14 by a sealant 64 (FIG. 5). A vacuum is then applied to a vacuum port 74 provided on the bag 62, drawing the bag up tightly against the plies and compacting them against the boot 14. This compaction process is repeated periodically during layup of the composite.

To prepare the mold assembly 16 for use, the interior surfaces of the mold assembly 16 are cleaned with a suitable solvent and are coated with a conventional release agent on the flanges 36 prior to joining the sections 18. The butt joint between sections 18 may be filled with a suitable high-temperature filler, or potting compound, to smooth the joint and to eliminate the generation of a parting line in the outer surface of the radome 10. One or more layers of a conventional parting agent are then applied to the interior surface of the assembled female mold half sections 18. In the current practice of the invention, the first parting agent is "DC 1-2531" manufactured by Dow Corning Corporation of Midland, Mich. and the second is "Frekote 33". When all of the necessary plies have been applied and compacted, and the female mold assembly 16 is prepared, the assembly 16 is placed over the layup (FIG. 3D). Preferably, the boot 14 is sized so that a cavity having a width of approximately 0.060 inch (0.015 cm) exists between the surface of the layup and the mold assembly 16, although the spacing may vary significantly across the layup.

At least one thermocouple 80 is positioned between the flange 38 of the female mold assembly 16 and the flange 32 of the boot 14 to monitor the curing temperature. Preferably, two thermocouples 80 are spaced approximately 180° apart.

When properly positioned, the female mold assembly 16 and boot 14 are joined together by clamp ring 20 (FIG. 3E), with clamp ring 20 being positioned against boot flange 32. The ends of slotted clamp straps 33, provided on bolts 31, are positioned against the clamp ring 20 and risers 37 (provided on flange 38). Nuts 35 are then tightened, causing straps 33 to seal boot flange 32 between clamp ring 20 and mold flange 38.

When clamp ring 20 has been installed, a vacuum line 86 is connected to the vacuum fitting 39 and the cavity between the boot 14 and mold assembly 16 is evacuated to a pressure of at least 20 inches of mercury (0.7 atmospheres), while the vacuum fitting 29 of the fixture 12 is vented (FIG. 3F). This places the uncured composite (previously compacted on the male fixture) in compression between the boot 14 and female mold assembly 16. The support fixture 12 is removed (FIG. 3G). The composite is then cured (FIG. 3H) at an elevated temperature and pressure by placing the boot and mold assembly into an autoclave. Because the autoclave subjects the boot and mold assembly to pressure, the cavity between these two parts is maintained under pressure during curing even with the cavity vented to the exterior of the autoclave. Thus, the uncured composite is pressurized in a manner that places minimal stress on the female mold assembly, allowing the shell-like configuration to be successfully employed.

After the laid up composite material 52 has cured appropriately and the assemblage is allowed to cool, clamp ring 20 is removed, the flexible boot 14 is pulled away from the inner surface of the cured composite material (FIGS. 3I and 3J), and the female mold half sections 18 are unbolted and removed from the outer surface of the cured composite individually. In many cases, if the mold assembly 16 was not formed in sections 18, removal of the part would be difficult, if not impossible, without damaging either the part or the mold. Excess material along the lower region of the cured composite material is trimmed and any necessary machining of the end, or edge band, of the material is performed to complete a radome 10 (FIG. 3K). The support 12, boot 14, and mold sections 18 are ready to be reused in the fabrication of subsequent radomes.

In view of the foregoing description, it will be recognized that the invention provides several distinct advantages. Efficient heat transfer is achieved during the curing process to ensure that a relatively uniform temperature exists throughout all portions of the composite material being cured. Only the clamp ring 20, flexible boot 14, and female mold half sections 18 need be constructed of heat-resistant material that is capable of withstanding the curing temperatures employed. Accordingly, the layup support fixture 12, flexible boot 14, and female mold half sections 18 are reusable in fabricating additional radomes 10. Most important, a smooth outer surface can now be obtained on radomes having a high aspect ratio without resorting to the difficult and time-consuming options of laying up plies inside a long, slender female mold where access is restricted, producing the part in sections laid up in corresponding female mold sections, or laying up plies on a male mandrel and filling and machining the outer surface. Instead, layup is on the easily accessible boot, which creates a smooth inner surface on the radome. Finally, the ease with which cured parts may be removed from the tooling reduces the time required to perform this step of the operation and the potential cost of damaged parts, which may occur when removal of the part is difficult. Because of these features, radomes and other tubular or shell-like parts can be fabricated both efficiently and economically.

The embodiment of the invention that is disclosed herein is exemplary in nature. Various changes and modifications can be made without departing from the scope and the spirit of the invention. For example, the female mold section need not be formed by two half sections 18. In some embodiments of the invention, the female mold section can be a unitary shell that can be pulled away from the cured composite material. If the composite structure includes recesses, grooves, or chambers, it may be desirable to subdivide the female mold section into more than two component parts. Therefore, the claims should be interpreted liberally in view of this description to cover the disclosed embodiments and their equivalents and should only be limited as is necessary in view of the pertinent prior art.

The embodiments of the invention in which an exclusive property or privilege is claimed are defined as follows:

1. A molding system, comprising:
a layup support fixture;
a boot securable over the support fixture to define a layup surface for a prepreg structure and;
a female mold, having a plurality of sections sealingly interconnected and disassemblable to allow easy release of the cured structure from the female mold, the mold having a smooth inner surface corresponding to the desired exterior surface configuration of the structure;
wherein the boot is sealingly securable to the female mold to define a cavity between the boot and mold for housing the structure during curing, and wherein the fixture, boot, and female mold allow layup of prepregs on the boot and curing of the prepreg structure thereafter in the female mold to yield a structure having an aerodynamically smooth outer surface formed to within close tolerance.

2. A molding system, comprising:
a layup support fixture that includes a support surface having a vacuum port in fluid communication therewith;
a boot securable over the support fixture to define a layup surface for a prepreg structure, the support fixture and boot including means for temporarily joining the fixture and boot together to form a partially airtight seal therebetween, the boot being drawn against the support surface when suction pressure is applied to the vacuum port of the fixture; and
a female mold, having a plurality of sections sealingly interconnected and disassemblable to allow easy release of the cured structure from the female mold, the mold having a smooth inner surface corresponding to the desired exterior surface configuration of the structure;
wherein the boot is sealingly securable to the female mold to define a cavity between the boot and mold for housing the structure during curing, and wherein the fixture, boot, and female mold allow layup of prepregs on the boot and curing of the prepreg structure thereafter in the female mold to yield a structure having an aerodynamically smooth outer surface formed to within close tolerance.

3. The system of claim 2, wherein the support surface includes a plurality of grooves in fluid communcation with the vacuum port, the grooves providing relatively uniform distribution of suction between the fixture and the boot.

4. The system of claim 3, wherein the female mold includes interconnection means for sealingly securing the boot to the female mold.

5. The system of claim 4, wherein the interconnection means includes an assembly flange that overlies a flange on the boot when the female mold is placed over the boot; the interconnection means further including a clamp ring and fastening means; the clamp ring being positionable in juxtaposition with the assembly flange about the boot flange; the fastening means being connected between the assembly flange and the clamp ring to compress the boot flange.

6. Apparatus for fabricating fabric-reinforced composite structures from reusable mold parts comprising: a layup support fixture, a flexible boot, and a female mold assembly; the fixture being relatively rigid and including a support surface; the boot having first and second, oppositely disposed surfaces and being configured and dimensioned for placement on the fixture with the support surface facing the first surface; the second surface providing a layup surface for layup of uncured composite material, the layup surface corresponding to the surface geometry of the inner surface of the composite structure to be fabricated; the female mold assembly having an inner surface that is configured and dimensioned to correspond to the outer surface of the composite structure to be fabricated, and including at least one vacuum port in fluid communication with the inner surface; the female mold assembly being positionable over a layup of the uncured composite material on the boot with the inner surface facing the material; the mold assembly further including interconnection means for joining the assembly to the boot to define a cavity for the material between the inner surface and the layup surface; the boot being drawn toward the inner surface when a pressure differential is applied between the cavity and the environment of the mold and boot to compress the material and to allow removal of the fixture prior to curing of the composite material.

7. The apparatus of claim 6, wherein the support fixture includes a vacuum port in fluid communication with the support surface, the support fixture and boot including means for temporarily joining the fixture and the boot together to form a partially airtight seal surrounding the first surface of the boot, the first surface being drawn firmly against the support surface of the fixture when suction pressure is applied to the vacuum port of the fixture.

8. The apparatus of claim 7, wherein the support surface includes a plurality of grooves in fluid communication with the vacuum port; the grooves providing relatively uniform distribution of suction between the fixture and the boot.

9. The apparatus of claim 7, wherein the interconnection means includes an assembly flange that overlies a flange on the boot when the mold assembly is placed over the boot; the interconnection means further including a clamp ring and fastening means; the clamp ring being positionable in juxtaposition with the assembly flange about the boot flange; the fastening means being connectable between the assembly flange and the clamp ring to compress the boot flange.

10. The apparatus of claim 9, wherein the boot is constructed of silicone rubber.

11. The apparatus of claim 6, further comprising means for compressing the material laid up on the layup surface prior to placement of the mold assembly over the material.

12. The apparatus of claim 11, wherein the means for compressing includes a vacuum bag that is positionable over a portion of the material, means for sealing the vacuum bag to enclose the material and means for supplying a vacuum to the vacuum bag to force the vacuum bag against the material.

13. The apparatus of claim 6, wherein the female mold assembly comprises at least two sections.

14. The apparatus of claim 13, further comprising a seal positionable between adjacent sections of the assembly.

15. The system of claim 1, wherein said support fixture is relatively rigid and removable from under the boot prior to curing of the prepreg structure.

* * * * *